US006115686A

United States Patent [19]
Chung et al.

[11] Patent Number: 6,115,686

[45] Date of Patent: Sep. 5, 2000

[54] HYPER TEXT MARK UP LANGUAGE DOCUMENT TO SPEECH CONVERTER

[75] Inventors: Jin-Chin Chung; Shaw-Hwa Hwang; Chung-Ping Chung, all of Hsinchu, Taiwan

[73] Assignee: Industrial Technology Research Institute, Taiwan

[21] Appl. No.: 09/053,629

[22] Filed: Apr. 2, 1998

[51] Int. Cl.[7] .............................. G10L 13/00; G06F 17/22

[52] U.S. Cl. ........................... 704/260; 704/270; 707/513

[58] Field of Search ..................................... 704/258, 260, 704/266, 267, 269, 270, 275; 379/88.16; 707/513

[56] References Cited

U.S. PATENT DOCUMENTS

| | | | |
|---|---|---|---|
| 5,555,343 | 9/1996 | Luther | 704/260 |
| 5,634,084 | 5/1997 | Malsheen et al. | 704/260 |
| 5,864,814 | 1/1999 | Yamazaki | 704/268 |
| 5,884,266 | 3/1999 | Dvorak | 704/275 |
| 5,890,123 | 3/1999 | Brown et al. | 704/275 |
| 5,899,975 | 5/1999 | Nielsen | 704/260 |
| 5,983,184 | 11/1999 | Noguchi | 704/270 |

OTHER PUBLICATIONS

Markku Hakkinen and John DeWitt, “pwWebSpeak: User Interface Design of an Accessible Webb Browser,” (Mar. 1998), 5 pps.

NetPhonic Communications, Inc., “Web–On–Call Voice Browser, Product Backgrounder,” URL: (Nov. 1997), 4 pps.

W W W Consortium, “Web Accessibility Initiative (WAI), ”(Mar. 1998), 3 pps.

W W W Consortium, “Aural Cascading Style Sheets (ACSS),” URL (Jan., 1997), 9 pps.

*Primary Examiner*—David R. Hudspeth
*Assistant Examiner*—Martin Lerner
*Attorney, Agent, or Firm*—Proskauer Rose LLP

[57] ABSTRACT

A system for converting a hyper text markup language (HTML) document to speech includes an HTML parser, an HTML to speech (HTS) control parser, a tag converter, a text normalizer and a TTS converter. The HTML parser receives data of an HTML formatted document and parses out content text, HTML text tags that structure the content text and control rules used only for translating the received data into sound. The HTS control parser parses control rules for converting the received data into sound. The HTS control parser modifies entries in one or more of a tag mapping table, an audio data table, a parameter set table, an enunciation modification table and a terminology translation table depending on each of the parsed control rules. The text normalizer modifies enunciation of each text string of the content text of the HTML document for which the enunciation modification table has an entry, according to an enunciation modification indicated in the respective enunciation table entry. The text normalizer also translates each text string of the content text of the HTML document for which the terminology translation table has an entry, according to a translation indicated in the respective terminology translation table entry. The tag converter modifies an intonation and a speed of audio generated from the content text of the HTML document encapsulated by each text tag for which the tag mapping table has an entry, as specified in corresponding entries of the parameter set table pointed to by pointers in the tag mapping table. The tag converter also inserts audio for each text tag for which the tag mapping table has an entry, as specified in corresponding entries of the audio data table pointed to by entries of the tag mapping table. The TTS converter converts the content text of the HTML document, as modified, translated and appended by the text normalizer and the tag converter, to speech audio.

15 Claims, 6 Drawing Sheets

| PID | Speed | Volume | Pitch |
|---|---|---|---|
| 0 | 1.0 | 0.8 | 1.2 |
| ... | ... | ... | ... |

42-11 42-12 42-13 42-14 42-1 42

| AID | Name | Audio Data |
|---|---|---|
| 0 | Beep.au | ... |
| ... | ... | ... |

43-11 43-12 43-13 43-1 43

| Element | Attributes | Type | APID |
|---|---|---|---|
| LI | | PARAM | <pointern> |
| LI | | AUDIO | <pointerm> |
| ... | ... | ... | ... |

41-11 113 41-12 41-13 41-14 41-1 41-2 41-24 41 41-21 123 41-22 41-23

| Original | Alternative | Candidates |
|---|---|---|
| 率 | 綠 | |
| 綠 | 帥 | 綠領 |
| 爲 | 維 | 轉換爲 |
| ... | ... | ... |

| Term | Translation |
|---|---|
| web | 全球資訊網 |
| world wide 全球資訊網 | 全球資訊網 |
| HTML 文件 | 超媒體文件 |
| ... | ... |

HYPER TEXT MARK UP LANGUAGE DOCUMENT TO SPEECH CONVERTER

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office Patent files or records, but otherwise reserves all copyright rights whatsoever.

FIELD OF THE INVENTION

This invention pertains to converting text documents to audible speech.

BACKGROUND OF THE INVENTION

Text to speech (TTS) converters are devices that convert a text document to audible speech sounds. Such devices are useful for enabling vision impaired individuals to use visible texts. Alternatively, TTS converters are useful for communicating information to any individual in situations where a visual display is not practical, as when the individual is driving or must focus his or her eyes elsewhere, or where a visual display is not present but an audio device, such as a telephone or radio, is present. Such visible texts may originate in tangible (e.g., paper) form and are converted to electronic digital data form by optical scanners and text recognizers. However, there is a large source of electronic or computer originating visual texts, such as from electronic mail (Email), calendar/schedule programs, news and stock quote services and, most notably, the World Wide Web.

In the case of electronic originating texts, speech data may be separately generated, e.g., by digitizing the voice of a human reader of the text. However, digitized voice data consumes a large fraction of storage space and/or transmission capacity—far in excess of the original text itself. It is thus desirable to employ a TTS converter for electronic originating texts.

Generating speech from an electronic originating text intended for visual display presents certain challenges for the TTS converter designers. Most notably, information is present not only from the content of the text itself but also from the manner in which the text is presented, i.e., by capitalization, bolding, italics, listing, etc. Formatting and typesetting codes of a text normally cannot be pronounced. Punctuation marks, which themselves are not spoken, provide information regarding the text. In addition, the pronunciation of text strings, i.e., sequences of one or more characters, is subject to the context in which text is used. The prior art has proposed solutions in an attempt to overcome these problems.

U.S. Pat. No. 5,555,343 discloses a TTS conversion technique which addresses formatting and typesetting codes in a text, contextual use of certain visible characters and formats and punctuation. A first predetermined table maps formatting and positioning codes, such as codes for generating bold, italics or underlined text, to speech commands for changing the speed or volume of the speech. A second predetermined table maps predetermined patterns of visible text, such as numbers separated by a colon (time) or numbers separated by slashes (date or directory), to replacement text strings. A third predetermined table maps punctuation, such as an exclamation point, to speech commands, such as a change in spoken pitch. An inputted text is scanned and spoken and non-spoken characters are mapped according to the tables prior to inputting the text to a TTS converter.

U.S. Pat. No. 5,634,084 discloses another TTS conversion technique. Inputted text is classified according to the context in which it appears. The classified text is then "expanded" by consultation to one or more tables that translate acronyms, initialisms and abbreviation text strings to replacement text strings. The replacement text strings are converted to speech in much the same way as a human reader would convert the text strings. For example, the abbreviation text string "SF, CA" may be replaced with the text string "San Francisco California", the initialism "NASA" may be left unchanged, and the mixed initialism, acronym "MPEG" may be replaced with "m peg."

The most important source of electronic text is the World Wide Web. Most of the electronic texts available from the World Wide Web are formatted according to the hyper text markup language (HTML) standard. Unlike other electronic texts, HTML "source" documents, from which content text is displayed, contain embedded textual tags. For example, the following is an illustrative example of a segment of an HTML source document:

```
<!BODY BGCOLOR=#DBFFFF>
<body bgcolor=white>
<CENTER>
<map name="Main">
<area shape="rect"coords="157,12,257,112"href="Main.html">
<area shape="rect"coords="293,141,393,241"href="VRML.html">
<area shape="rect"coords="18,141,118,241"href="VRML.html">
<area shape="rect"coords="157,266,257,366"href="Main.html">
</map>
<img src="Images/Main.gif" usemap="#Main" border=0></img>
<br><br><br><br>
<b>
<font size=3 color=black>
Welcome to the VR workgroup of our company
</font>
<a href=
"http://www.itri.org.tw"><font size=3 color=blue>ITRI</font></a>
<font size=3 color=black>/</font>
<a href=
"http://www.ccl.itri.org.tw"><font size=3 color=blue>CCL</font></a>
<font size=3 color=black>. We have been<br>
developing some advanced technologies as fotlows.<br>
</b>
<ul>
<a href="Main.html">
<li><font size=3 color=blue>PanoVR</font>
</a>
<font size=3>(A panoramic image-based VR)</font><br>
<a href="VRML.html">
<li><font size=3 color=blue>CyberVR<font>
</a>
<font size=3>(A VRML 1.0 browser)</font><br>
</ul>
<br><br><a href="Winner.html"><img src=
"Images/Winner.gif" border=no></img></a><br>
<a>
<br><br>
<font size=3 color=black>
<br>You are the <img src="cgi-bin/Count.cgi?df=
vvr.dat"border=0 align=middle>th
visitor<br>
</font>
<HR SIZE=2 WIDTH=480 ALION=CENTER>
(C) Copyright 1996 Computer and Communication Laboratory,<BR>
Industrial Technology Research Institute, Taiwan, R.O.C.
</BODY>
```

The HTML source document is entirely formed from displayable text characters. The HTML, source document can be divided into content text and HTML tags. HTML tags are enclosed between the characters "<" and ">". There are two types of HTML, tags, namely, start tags and end tags. A start tag starts with "<" and an end tag starts with "</". Thus, "<font size=3 color=black>" is a start tag for the tag "font" and </font> is an end tag for the tag "font". All other text is content text.

HTML tags impart meaning to content text encapsulated between a start tag and an end tag. Such "meaning" may be used by a display program, such as a web browser, to change attributes associated with the display, e.g., to display content text in a particular location of the display screen, with a particular color or font, a particular style (bold, italics, underline), etc. However, the choice as to which actual attributes, if any, to impart to the content text encapsulated between the start and end tags is entirely in the control of each browser. This enables a variety of browsers and display terminals with varying display capabilities to display the same content text, albeit, somewhat differently from browser to browser and terminal to terminal. In this fashion, the HTML tags structure the content text which structure can be used for, amongst other things, altering the display of the content text. Note also a second property of HTML tags, namely, that the tags can be nested in a tree-like structure. For example, tags "<b>" and "<font size=3 color=black>" apply to the content text "Welcome to the VR workgroup of our company", tags "<b>", "<a href="http://www.itri.org.tw">" and "<font size=3 color=blue>" apply to the content text "ITRI", tags "<b>" and "<font size=3 color=black> apply to the content text "/", tags "<b>", "<a href="http://www.ccl.itri.org.tw">" and "<font size=3 color=blue>" apply to the content text "CCL", tags "<b>" and "<font size=3 color=black>" apply to the content text ". We have been" and tags "<b>" and "<br>" apply to the content text "developing some advanced technologies as follows."

The above example of an HTML document is in the English language. However, the HTML standard supports display of documents of a variety of languages including languages such as Chinese, Japanese and Korean which use a large symbol set instead of a simple alphabet. Most users of the World Wide Web who access HTML documents primarily in a language other than English are familiar with certain common technical English language terms such as "Web," "World Wide Web," "HTML," etc. It is therefore not uncommon to find HTML documents available on the World Wide Web containing content texts that are composed mostly of a language other than the English language, such as Chinese, but also containing some standard technical English language terms.

Another aspect of languages other than English, such as Chinese, is that certain symbols a of such languages may have multiple enunciations depending on the other symbols in the text string with which the symbol in question appears. The same is true for certain English language texts when a term in another language is phonetically transliterated to English, such as from Chinese, French, Hebrew, etc.

The conventional TTS converters described above are not well suited for translating HTML documents. First, the HTML tags used by the browser to modify the positioning or attributes of the content text, themselves, are text and are thus not easily parsed or distinguished from the content text. In any event, the prior art TTS converters do not teach how to identify which content text to assign a particular intonation and speed when such content text is encapsulated by attribute or position indications such as HTML start and end tags, especially when such HTML tags can be nested in a tree-like structure. Second, the prior art TTS converters do not modify the enunciation of a particular symbol of a language whose enunciation can vary with the context in which the symbol is used. TTS converters are available for converting non-English texts, such as Chinese texts to speech. However, such TTS converters can only translate the text of that language correctly and typically ignore text in another language, such as English.

Accordingly, it is an object of the present invention to overcome the disadvantages of the prior art.

SUMMARY OF THE INVENTION

This and other objects are achieved according to the present invention. According to one embodiment, a computer system is provided for converting the data of a hyper text markup language (HTML) document to speech. The computer system includes an HTML parser, an HTML to speech (HTS) control parser, a tag converter, a text normalizer and a TTS converter. The HTML parser receives data of an HTML formatted document and parses out content text, HTML text tags that structure the content text and control rules used only for translating the received data into sound. The HTS control parser parses out of the control rules for converting the received data into sound. The HTS control parser modifies entries in one or more of a tag mapping table, an audio data table, a parameter set table, an enunciation modification table and a terminology translation table depending on each of the parsed control rules. The text normalizer modifies enunciation of each text string of the content text of the HTML document for which the enunciation modification table has an entry, according to an enunciation modification indicated in the respective enunciation table entry. The text normalizer also translates each text string of the content text of the HTML document for which the terminology translation table has an entry, according to a translation indicated in the respective terminology translation table entry. The tag converter modifies an intonation and a speed of audio generated from the content text of the HTML document encapsulated by each text tag for which the tag mapping table has an entry, as specified in particular entries of the parameter set table. The tag converter also inserts audio for each text tag for which the tag mapping table has an entry, as specified in particular entries of the audio data table. The above noted particular entries of the parameter set table and audio data table are the corresponding entries of these tables pointed to by pointers contained in entries of the tag mapping table that are indexed by each of the text tags. The TTS converter converts the content text of the HTML document, as modified, translated and appended by the text normalizer and the tag converter, to speech audio.

Illustratively, the system according to the invention can accommodate HTML documents with nested HTML textual tags, enunciate symbols correctly depending on context and can properly convert mixed language documents to speech using a TTS converter that can only accommodate a single one of the languages. The system according to the invention is simple to use and can be easily tailored by the user and text provider to enhance the TTS conversion.

BRIEF DESCRIPTION OF THE DRAWING

FIGS. 4(*a*), (*b*) and (*c*) show a parameter set table, an audio data table and a tag mapping table according to an embodiment of the present invention.

FIGS. 5(*a*) and (*b*) show an enunciation modification table and a terminology translation table according to an embodiment of the present invention.

DETAILED DESCRIPTION OF THE INVENTION

Figure 1:
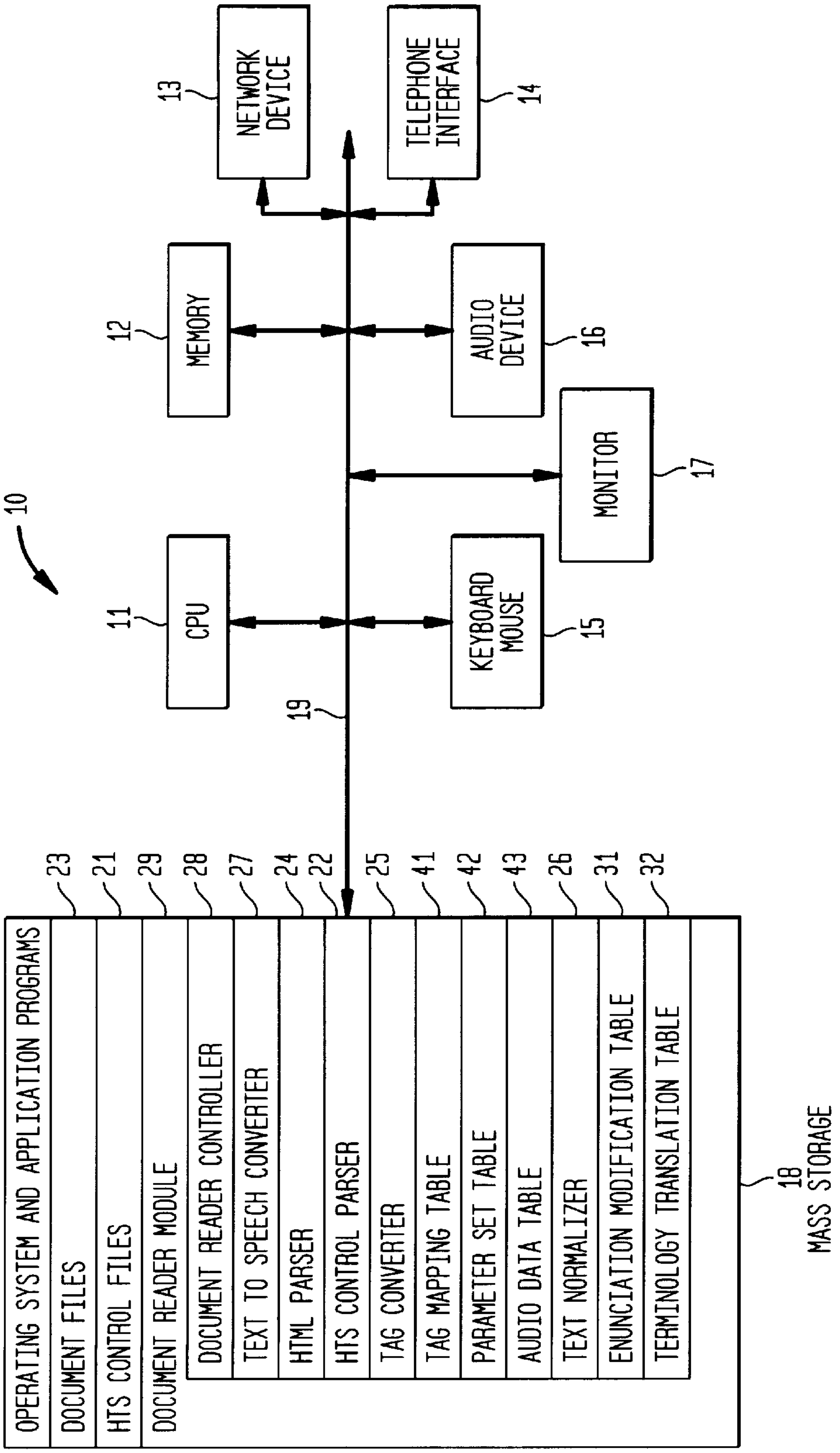
FIG. 1 shows an HTS system according to an embodiment of the present invention.

FIG. 1 shows an HTS system 10 according to an embodiment of the present invention. The HTS system is in the form of a computer system including a CPU or processor 11, primary memory 12, network device 13, telephone interface 14, keyboard and mouse 15, audio device 16, display monitor 17 and mass storage device 18. Each of these devices 11–18 is connected to a bus 19 which enables communication of data and instructions between each of the devices 11–18. The mass storage device 18 may include a disk drive for storing data and a number of processes (described below). The primary memory 12 is also for storing data and processes and is typically used for storing instructions and data currently processed by the processor 11. The processor 11 is for executing instructions of various processes and processing data. The network device 13 is for establishing communications with a network and can for example be an Ethernet adaptor or interface card. The telephone interface 14 is for establishing communication with a dial up network via a connection switched public telephone network. The keyboard and mouse 15 are for obtaining manually inputted instructions and data from a user. The display monitor 17 is for visually displaying graphical and textual information. The audio device 16 is any suitable device that generates an audible sound from an audio data signal or other information specifying a particular sound. The audio device 16 preferably includes a loudspeaker or headset and may have a standard musical instrument digital interface (MIDI) input.

As shown, the mass storage device 18 stores an operating system and application programs, HTML (and possibly other) document files 23, HTS control files 21 and a document reader module 29. The operating system and application programs can be any suitable operating system and application programs known in the prior art and therefore are not described in greater detail. The document reader module 29 includes a document reader controller 28, a TTS converter 27, an HTML parser 24, an HTS control parser 22, a tag converter 25, a tag mapping table 41, a parameter set table 42, and audio data table 43, a text normalizer 26, an enunciation modification table 31 and a terminology translation table 32.

Although each of the above noted processes 22, 24–29 are time-shared executed on the processor 11, this is simply for sake of convenience. Each of the processes 22, 24–29 could instead be implemented with suitable application specific hardware to achieve the same functions. Construction of such hardware is well within the skill in the art and therefore is not described in greater detail. Hereinafter, each process 22, 24–29 will be referred to as a module 22, 24–29, and it will be assumed that each module 22, 24–29 is a stand alone dedicated piece of hardware for performing the various functions described below. The TTS converter 27 and HTML parser 24 are well known modules in the prior art. Any suitable prior art TTS converter 27 and HTML parser 24 modules may be used in conjunction with modules 22, 25, 26 and 28 described below. As such, these modules 24 and 27 are not described in greater detail below.

Figure 2:
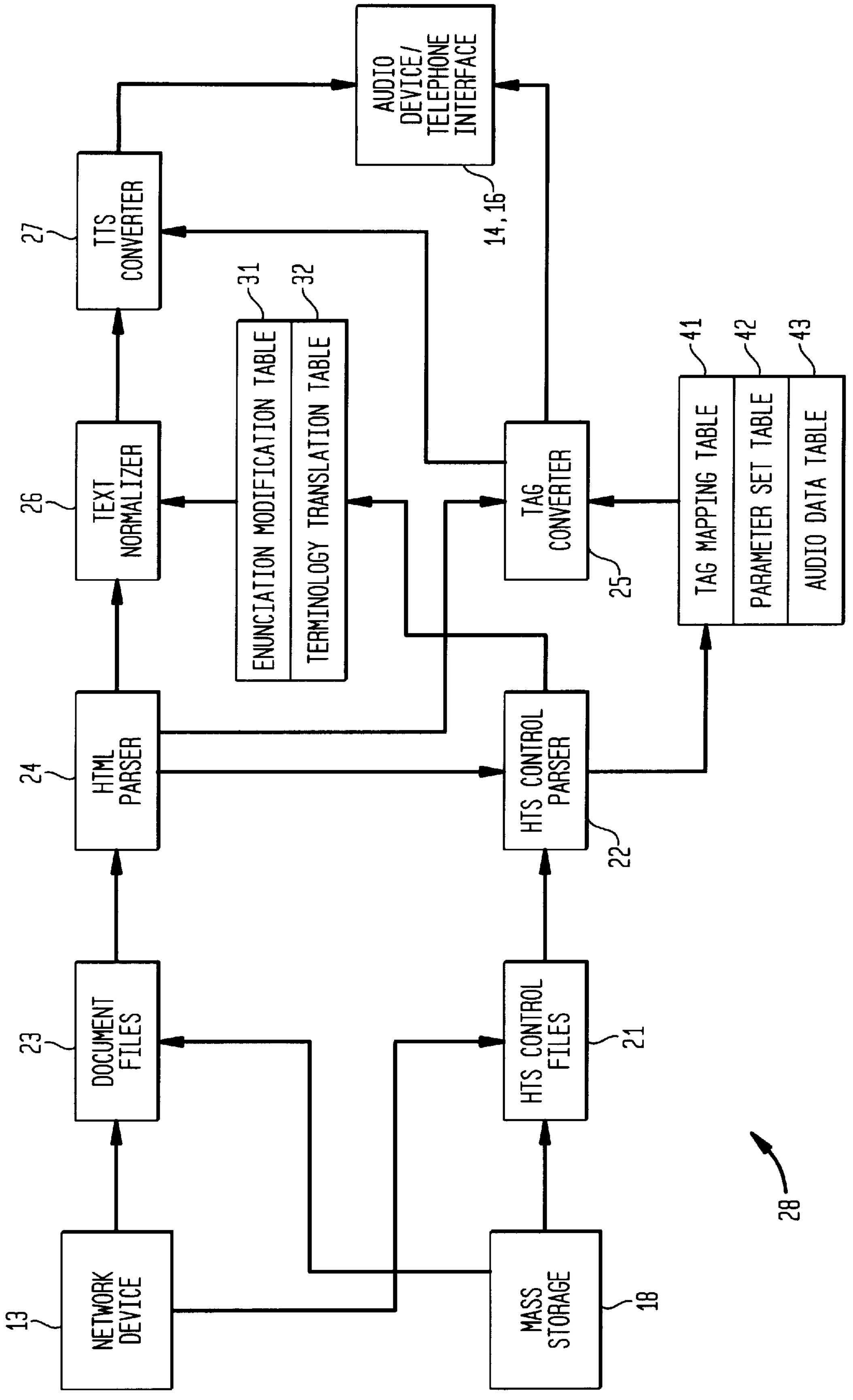
FIG. 2 shows the flow of data through the various procedures and hardware in the inventive HTS system of FIG. 1.

Referring to FIG. 2, an illustrative flow of data through the document reader controller 28 is shown. HTML document files 23 are presumed to originate from the network device 13, although they can also originate from the telephone interface 14 or be retrieved from the mass storage device 18. HTS control files 21 may be retrieved from the mass storage device 18. Alternatively, or in addition, HTS control files may also originate from the network device 13, the telephone interface 14 or may in fact be embedded in the HTML document files 23, as described below.

The HTML parser 24 parses the HTML document files 23 to produce HTML tags, HTS control rules and content text. The HTML parser 24 outputs the HTML tags to the tag converter 25. The HTML parser 24 outputs the content text to the text normalizer 26. The HTML parser 24 outputs the HTS control rules to the HTS control parser 22.

The HTS control parser 22 receives the HTS control rules in the independently retrieved HTS control files 21 and the HTS control rules embedded in the HTML document files 23 parsed by the HTML parser 24. Four different types of rules may be received namely:

(1) an intonation/speed modification rule of the form: PARAM tag attributes parameter_set;

(2) an audio data rule of the form: AUDIO tag attributes audio_file;

(3) an enunciation modification rule of the form: ALT original_text_string replacement_text_string candidates; and (4) a terminology translation rule of the form: TERM term_text_string replacement_translation_text_string.

Figures 3, 4A, 4B, 4C:
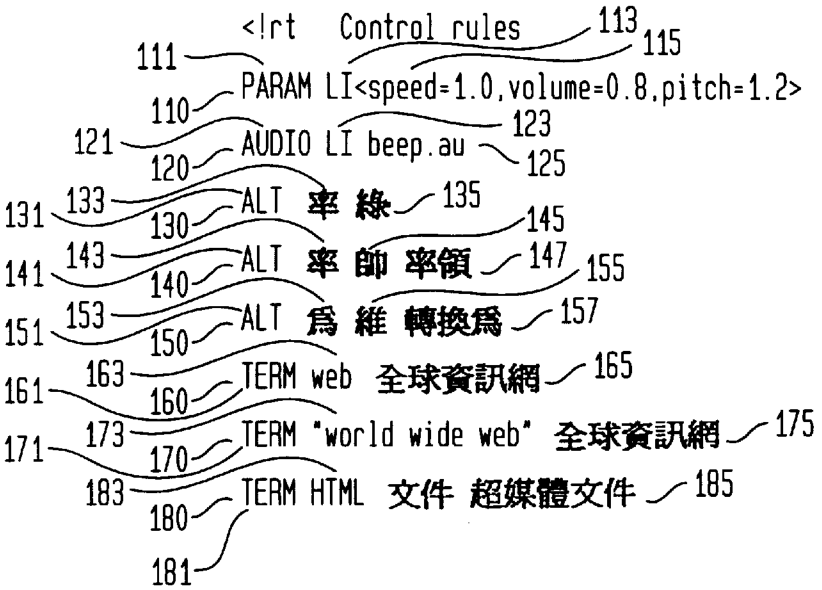
FIG. 3 shows an illustrative sequence of HTS control rules embedded in an HTML comment tag of an HTML document according to an embodiment of the present invention.

FIG. 3 illustrates a sequence of HTS control rules 110, 120, 130, 140, 150, 160, 170 and 180 embedded in an HTML comment tag. Rule 110 is an intonation/speed modification rule designated by the "PARAM" identifier 111. This intonation/speed modification rule 110 specifies that all content text modified by the HTML tag 113 "<LI>" should be spoken with the intonation and/or speed parameters specified in the parameter set 115, namely, speed=1.0, volume=0.8 and pitch=1.2. An intonation/speed modification rule can also optionally specify attributes, e.g., between the tag 113 and parameter set 115. The attributes specify limitations on the application of the modification specified in the rule 110.

Rule 120 is an audio data rule as designated by the "AUDIO" identifier 121. This audio data rule specifies that the audio data specified by the identifier 125 "beep.au" (in this case a file named beep.au), should be inserted into the generated speech and/or signal when the HTML tag "<LI>" modifies the content. An audio data rule can also specify attributes, e.g., between the tag 123 and audio data 125. The attributes specify limitations on the insertion of the audio data 125 specified in the rule 120.

In response to intonation/speed modification rules and audio data rules, the HTS control parser 22 modifies either the parameter set table 42 shown in FIG. 4(*a*) or the audio data table 43 shown in FIG. 4(*b*). The HTS control parser 22 then modifies the tag mapping table 41, as shown in FIG. 4(*c*).

In the case of an intonation/speed modification rule 110, the HTS control parser 22 modifies an existing, or adds a new, entry 42-1, to the parameter set table 42 as shown in FIG. 4(*a*). The HTS control parser 22 obtains an available entry 42-1, or reassigns a previously used entry corresponding to a label that is being redefined, of the parameter set table 42. The HTS control parser 22 then loads the parameters of the parameter set 115 specified in the rule 110 into the appropriate fields 42-12, 42-13 and 42-14 of the modified or added entry 42-1. The parameter set identifier or PID field 42-11 illustratively is a dummy field and may be omitted in actual implementation.

In the case of an audio data rule 120, the HTS control parser 22 modifies an existing, or adds a new, entry 43-1, to the audio data table 43 as shown in FIG. 4(*b*). The HTS control parser 22 identifies an available entry 43-1, or modifies an existing entry corresponding to a label that is redefined by the rule 120. The HTS control parser 22 then loads the audio file name 125 specified in the rule 120, and the audio data of the specified audio file, into the appropriate fields 43-12 and 43-13 of the modified or added entry 43-1. Illustratively, the audio data identifier or AID field 43-11 is a dummy field and can be omitted in an actual implementation.

After modifying the parameter set table 42 or the audio data table 43, the HTS control parser 22 modifies the tag mapping table 41. Specifically, the HTS control parser 22 modifies an existing entry 41-1 or 41-2 indexed by the tag 41-11 or 41-21 of the rule, namely 113 or 12 adds a new entry 41-1 or 41-2 indexed by such a tag 41-11 or 41-21 if none already exists. Preferably, only one parameter set table 42 referencing entry 41-1 and only one audio data table 43 referencing entry 41-2, for a total of two entries 41-1 and 41-2, are maintained for each tag 41-11 or 41-21. In response to a subsequent intonation/speed modification rule for the same tag 41-11 "<LI>", the HTS control parser 22 modifies the entry 41-1. Likewise, in response to a subsequent audio data rule for the same tag 41-2 "<LI>", the HTS control parser 22 modifies the entry 41-2. Each added or modified tag mapping table entry 41-1 or 41-2 indexed by a tag 41-11 or 41-21 is loaded by the HTS control parser 22 with an indication 41-13 or 41-23 of which other table to access, namely, PARAM indicating access to the parameter set table 42 or AUDIO indicating access to the audio data table 43. The HTS control parser 22 also stores a pointer <pointern> or <pointerm>41-14 or 41-24 in the audio/parameter identifier or APID field for each HTML tag 41-1 or 41-2. The pointers 41-14 or 41-24 point to respective entries in the parameter set table 42 or audio data table 43 in which the parameter set or audio data corresponding to the tag has been stored. An attribute 41-12 or 41-22 may also be assigned to each entry 41-1 or 41-2 limiting application of the parameter set or audio data to specific occurrences as specified by the attributes. Preferably, no such attributes are specified.

Referring again to FIG. 3, three enunciation modification rules 130, 140 and 150 are parsed by the HTS control parser 22, as specified by the identifier 131, 141 and 151 "ALT". Each enunciation modification rule 130, 140 and 150 specifies a particular text string 133, 143 or 153 to be replaced with a different text string 135, 145 or 155. The replacement text strings 135, 145 and 155 when converted to speech by the TTS converter 27 will produce the correct enunciation. Two of the rules, namely 140 and 150, also specify candidates 147 and 157. In response, the HTS control parser 22 modifies or adds entries 31-1, 31-2 and 31-3 to the enunciation modification table 31 as shown in FIG. 5(*a*). The original, to-be-replaced string 133, 143 or 153 is loaded and normalized by the HTS control parser 22 into an index field 31-11, 31-21, or 31-31, of the respective entry 31-1, 31-2 or 31-3. The replacement string 135, 145 is loaded and normalized by the HTS control parser 22 into the field 31-12, 31-22 or 31-32 of the respective entry 31-1, 31-2 or 31-3. The candidates 147 or 157, if any, are loaded by the HTS control parser 22 into the candidates field 31-23 or 31-33 of the respective entry 31-2 or 31-3.

Referring again to FIG. 3, the HTS control parser 22 also parses terminology translation rules 160, 170 and 180 as indicated by the identifier 161, 171 and 181 "TERM". Each terminology translation rule 160, 170 and 180 specifies a to-be-replaced string 163, 173 or 183 in the HTML document 23 and a translation replacement string 165, 175 or 185, therefor. Each translation replacement string is either a translation or transliteration of the to-be-replaced string into a string that can be converted to speech by a known TTS converter 27 (e.g., a TTS converter 27 that is known to translate Chinese symbols but is not known to translate English words). In response, the HTS control parser 22 modifies an existing, or adds a new entry 32-1, 32-2 or 32-3 in the terminology translation table 32 for each terminology translation rule 160, 170 and 180, as shown in FIG. 5(*b*). The to-be-replaced string 163, 173 or 183 is loaded and normalized by the HTS control parser 22 into the index field 32-11, 32-12 or 32-13 of the corresponding entry 32-1, 32-2 or 32-3. The translation replacement string 165, 175 or 185 is loaded and normalized by the HTS control parser 22 into the field 32-12, 32-22 or 33-23 of the corresponding entry 32-1, 32-2 or 32-3.

Referring again to FIG. 2, the text normalizer 26 receives the content text from the HTML parser 24. The text normalizer 26 searches the received content text for to-be-replaced text strings in the enunciation modification table 31 and the terminology translation table 32. The text normalizer 26 replaces each instance of each to-be-replaced string as indicated in the enunciation modification table 31 and the terminology translation table 32. The modified content text is then outputted to the TTS converter 27.

The tag converter 25 receives the HTML tags outputted from the HTML parser 24. In response, the tag converter 25 accesses the table 41 using the received HTML tags as indexes. If an entry is retrieved, the tag converter 25 uses the APID to index the appropriate table 42 and/or 43 to retrieve intonation and speed parameters and/or audio data. The retrieved intonation and speed parameters are then outputted to the TTS converter 27 and the retrieved audio data is outputted to the audio device 16 or telephone interface 14.

The TTS converter 27 receives the modified content text and the intonation speed parameters. The TTS converter 27 generates speech audio from the content text having the intonation and speed specified by the received intonation and speed parameters. The speech audio thus generated is then outputted to the audio device 16 or telephone interface 14.

Figures 5A, 5B, 6:
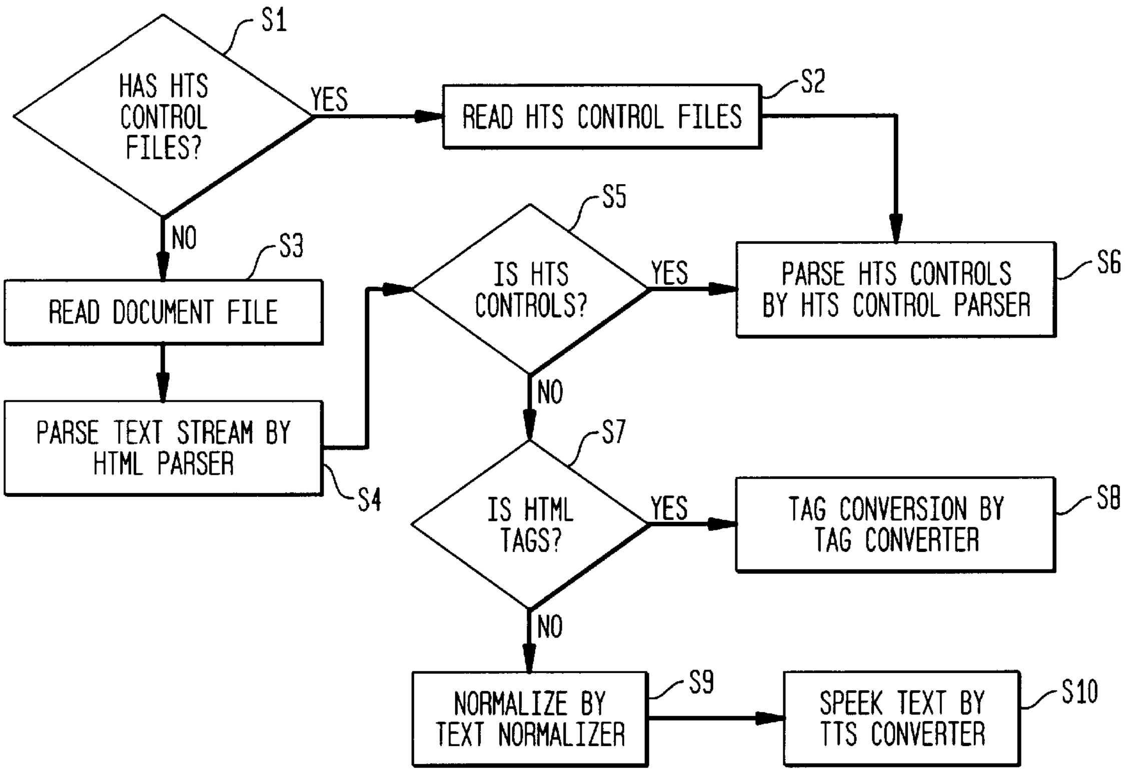
FIG. 6 shows the steps executed in a document reader controller according to an embodiment of the present invention.

FIG. 6 shows a flow chart illustrating the operation of the document reader 28 of FIG. 2. In step S1, the system 10 (processor 11 executing the operating system or application process) determines if there are any independent HTS control files 21 to be read. If so, the document reader controller 28 reads such files in step S2 and the HTS control parser 22 parses the HTS control rules contained therein in step S6. After executing step S6, or if no independent HTS control files 21 are to be read, the document reader controller 28 reads an HTML document file 23 in step S3. The HTML parser 24 parses each element in the HTML document file 23, i.e., each HTML tag, each string of content text and each HTS control rule. If an HTS control rule is encountered in step S5, the HTS control rule is parsed by the HTS control parser 22 in step S6. After executing step S6 this time, execution returns to step S4 and another element is parsed from the HTML document file 23. If the parsed element is not an HTS control rule, step S7 is executed. If an HTML tag is parsed in step S7, the tag converter 25 converts the tag in step S8, i.e., uses the tag to access the tag mapping table 41 and, depending on the indexed entries retrieved therefrom, also indexes the parameter set table 42 and/or the audio data table 43. After executing step S8, execution returns to step S4 and another element is parsed from the HTML document file 23. If the parsed HTML element is not an HTML tag then step S9 is executed. In step S9, the parsed element is assumed to be content text. The text normalizer 26 normalizes the content text, as described above. The normalized content text is then outputted to the TTS converter 27 in step S10 which generates speech audio from the normalized content text using the intonation and speed parameters provided by the tag converter 25. The speech audio is generated from the content text of the HTML document, as modified by the text normalizer 26 using the intonation and speed parameters outputted by the tag converter 25. The speech audio is outputted as an audible sound from the audio device 16 or telephone interface 14 as interspersed between the audio sound generated by the audio device 16 or telephone interface 14 from the audio data inserted by the tag converter 25.

Execution then returns to step S4 and another element is parsed from the HTML document file 23. This is repeated until all elements are parsed form the HTML document file 21.

Figure 7:
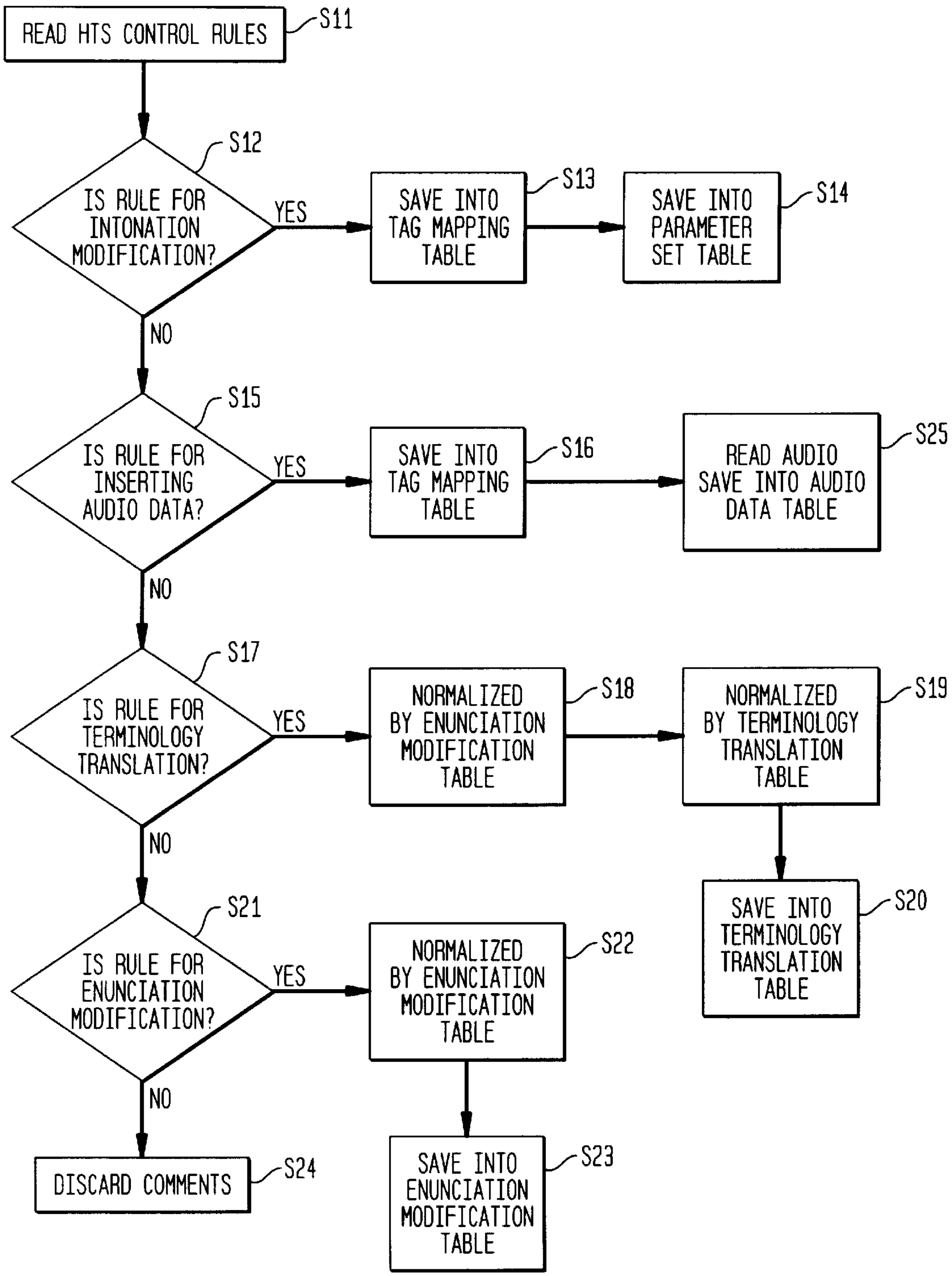
FIG. 7 shows the steps executed in an HTS control parser according to an embodiment of the present invention.

FIG. 7, shows a flowchart illustrating the processing of the HTS control parser 22. In step S11, the HTS control parser 22 reads an HTS control rule. In step S12, the HTS control parser 22 determines if the HTS control rule is an intonation modification rule. If so, in step S13, the HTS control parser 22 saves the tag name, PARAM indication, attributes and pointer in an entry of the tag mapping table 41 indexed by the HTML tag. Then, in step S 14, the HTS control parser 22 saves the parameter set in an entry of the parameter set table 42 pointed to by the pointer in the entry of the tag mapping table 41 indexed by the HTML tag indicated in the rule. Execution then returns to step S11.

If the parsed rule is not an intonation modification rule then the HTS control parser 22 determines if the parsed rule is an audio data rule in step S15. If so, then in step S16, the HTS control parser 22 saves the tag name, AUDIO indication, attributes and pointer in an entry of the tag mapping table 41 indexed by the HTML tag. Then, in step S25, the HTS control parser 22 retrieves the audio data specified by the audio data file and saves the audio data file indication and audio data in an entry of the audio data table 43, pointed to by the pointer in the entry of the tag mapping table 41 indexed by the HTML tag indicated in the rule. Execution then returns to step S11.

If the parsed rule is not an audio data rule then the HTS control parser 22 determines if the parsed rule is a terminology translation rule in step S17. If so, then in step S18, the HTS control parser 22 "normalizes" the terminology translation rule according to the enunciation modification table 32. In other words, the HTS control parser 22 replaces any strings specified in the rule (i.e., term__text__string or replacement__translation__text__string) as per replacement strings indicated by existing entries of the enunciation modification table 31. Next, in step S19, the HTS control parser 22 "normalizes" the terminology translation rule according to the existing terminology translation table 32. In other words, the HTS control parser 22 replaces any strings specified the rule as per replacement strings indicated by existing entries of the terminology translation table 32. The HTS control parser 22 then saves the normalized term__text string and replacement__translation__text__string in an entry of the terminology translation table 32 in step S20. Execution then returns to step S11.

If the parsed rule is not a terminology translation rule then the HTS control parser 22 determines if the parsed rule is an enunciation modification rule in step S21. If so, then in step S22, the HTS control parser 22 "normalizes" the enunciation translation rule according to the enunciation modification table 32. In other words, the HTS control parser 22 replaces any strings specified in the rule (i.e., original__text__string, replacement__text__string or candidates) as per replacement strings indicated by existing entries of the enunciation modification table 31. The HTS control parser 22 then saves the normalized original__text__string, replacement__text__string and candidates in an entry of the enunciation modification table 31 in step S23. Execution then returns to step S11.

If the parsed rule is not an enunciation modification rule then the HTS control parser 22 determines that the rule must be a comment in step S24. In step S24, the HTS control parser 22 discards the comment. Execution then returns to step S11. Steps S11–S24 are repeated until all HTS control rules provided to the HTS control parser 22 are parsed.

Figure 8:
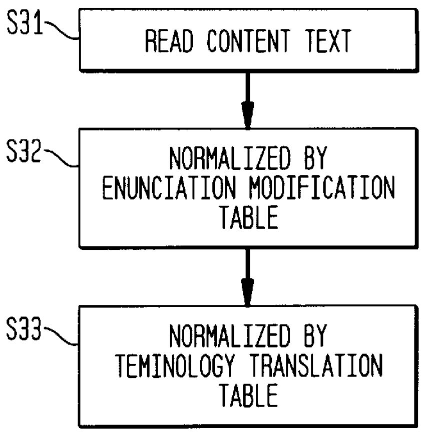
FIG. 8 shows the steps executed in a text normalizer according to an embodiment of the present invention.

FIG. 8 shows a flowchart that illustrates the processing by the text normalizer 26. The text normalizer 26 reads the content text of the HTML document file 23 in step S31. In step S32, the text normalizer 26 normalizes the read content text using the enunciation modification table 31. In particular, the text normalizer 26 scans the content text for any occurrence of a string that matches any of the original__text__strings indexing an entry of the enunciation modification table 31. Upon detecting the occurrence of a string in the content text that matches an original__text__string, the text normalizer 26 next determines if the matching string of the content text of the HTML document file 23 occurs as a substring of a second string of the content text that matches one of the candidates indicated in one of the entries indexed by the matching original__text__string. If so, the text normalizer 26 replaces the matching string with the replacement__text__string of the entry having a candidate that matches the second string of the content text. If no second string including the matching string of the content text matches any candidates, then the text normalizer 26 replaces the matching string with the replacement__text__string of an entry that does not specify a candidate, if such an entry exists.

Next, in step S33, the text normalizer 26 normalizes the content text, as normalized in step S32, using the terminology translation table 32. In so doing, the text normalizer 26 scans the content text for any occurrence of a string that matches any of the term__text__strings indexing an entry of the terminology translation table 32. Upon detecting the occurrence of a string in the content text that matches a term__text__string, the text normalizer 26 replaces the matching string with the replacement__translation__text__string of the entry indexed by the matching term__text__string. After executing step S33, the text normalizer 26 returns to an idle state awaiting the next transfer of content text from the HTML parser 24.

Figure 9:
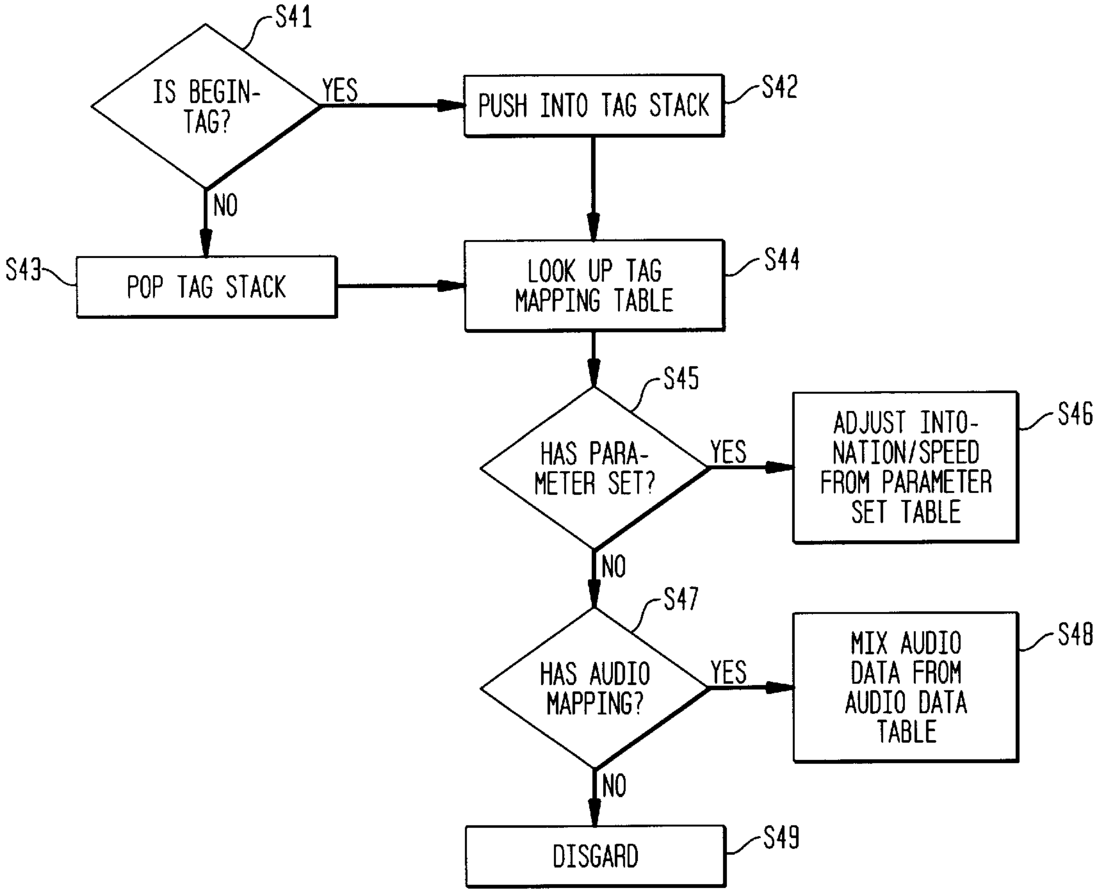
FIG. 9 shows the steps executed in a tag converter according to an embodiment of the present invention.

FIG. 9 shows a flowchart illustrating the processing performed by the tag converter 25. The processing performed by the tag converter 25 accommodates nested HTML tags that if encapsulate content text using a stack, which may be maintained in the primary memory 12 or processor 11. Specifically, in step S41, the tag converter 25 determines whether or not the last HTML tag provided to it by the HTML parser 24 is a begin tag. If so, in step S42, the tag converter 25 pushes the HTML tag onto a stack. If not, the tag converter 25 pops an HTML tag from the top of the stack, in step S43.

In step S44, the tag converter 25 reads a copy of the HTML tag at the top of the stack and indexes the tag mapping table 41 using the read HTML tag. In step S45, the tag converter 25 determines whether or not an entry of the tag mapping table 41 is indexed by the copy of the HTML tag which indexed entry has the PARAM indication set. If so, the tag converter uses the pointer of the indexed tag mapping table entry to identify the corresponding entry of the parameter set table 42 in step S46. The parameters in the entry of the parameter set table 42 pointed to by the pointer are retrieved and transferred to the TTS converter 27.

After executing step S46, or if no indexed entry has the PARAM indication set in step S45, the tag converter determines whether or not an entry of the tag mapping table 41 is indexed by the copy of the HTML tag at the top of the stack, which indexed entry has the AUDIO indication set. If so, the tag converter uses the pointer of the indexed tag mapping table entry to identify the corresponding entry of the audio data table 43 in step S48. The audio data in the entry of the audio data table 43 pointed to by the pointer is retrieved and transferred to the audio device 16 or the telephone interface 14.

If no indexed entry has the AUDIO indication set, the tag converter disregards the tag in step S49. After executing step S49, the tag converter returns to an idle state and awaits receipt of the next HTML tag.

Note that the use of the stack by the tag converter 25 ensures that audio data associated with the innermost nested HTML tag is inserted into the generated audio and that the intonation and speed parameters associated with the innermost nested HTML tag are used to generate speech from the content text encapsulated by the innermost, nested HTML tag. When an end tag is reached, the tag converter inserts the audio data of, or uses the intonation and speed parameters associated with, the current innermost nested HTML tag.

The embodiments described above are intended to be merely illustrative of the invention. Those having ordinary skill in the art may devise numerous alternative embodiments without departing from the spirit and scope of the following claims.

What is claimed is:

1. A computer system for converting a hyper text markup language (HTML) document into audio signals comprising:

an HTML parser receiving data of an HTML formatted document for parsing out content text, HTML text tags that structure said content text and control rules used only for translating said received data into sound, an HTML to speech (HTS) control parser for parsing out of said control rules for converting said received data into sound, said HTS control parser modifying entries in one or more of a tag mapping table, an audio data table, a parameter set table, an enunciation modification table and a terminology translation table depending on each of said parsed control rules, a text normalizer for modifying enunciation of each text string of said content text for which said enunciation modification table has an entry, according to an enunciation modification indicated in said respective enunciation table entry, and for translating each text string of said content text for which said terminology translation table has an entry, according to a translation indicated in said respective terminology translation table entry, a tag converter for modifying an intonation and a speed of audio generated from said content text encapsulated by, and for inserting audio data at, each text tag for which said tag mapping table has an entry, as specified in corresponding entries of said parameter set table and said audio data table pointed to by pointers in entries of said tag mapping table indexed by each of said text tags, respectively, and a text to speech converter for converting said content text, as modified, translated and appended by said text normalizer and said tag converter, to speech audio.

2. In a hyper text markup language (HTML) text to speech (HTS) control parser, a method for converting data of an HTML document to speech comprising the steps of:

parsing one or more intonation/speed modification rules that specify intonation and speed modification parameters for generating speech encapsulated by particular text tags of an HTML document and one or more rules that specify audio data to be inserted for particular text tags of an HTML document, and generating a tag mapping table mapping said text tags to corresponding tag identifiers, a parameter set table of entries containing parameter sets pointed to by pointers in corresponding tagged entries of said tag mapping table, and an audio data table of entries containing audio data pointed to by pointers in corresponding tagged entries of said tag mapping table, according to said parsed intonation/speed modification and audio data rules, respectively, and parsing one or more rules for modifying enunciation of particular strings of content text of an HTML document and one or more rules for translating particular strings of said content text of an HTML document to terms that can be converted to speech by a text to speech converter, and generating an enunciation modification table mapping particular ones of said particular strings to replacement enunciation strings and a terminology translation table mapping particular ones of said particular strings to replacement terminology strings, according to said parsed enunciation modification and terminology translation rules, respectively.

3. In a parcer and text normalizer, a method for converting data of a hyper text markup language (HTML) document to speech audio comprising the steps of:

parsing one or more HTML to speech (HTS) control rules, including generating a tag mapping table entry indexed by an HTML text tag specified in an audio data rule and containing a tag identifier unique to said HTML text tag, and generating an audio data table entry, pointed to by said entry of said tag mapping table indexed by said tag specified in said audio data rule, and containing audio data indicated by said audio data rule, replacing each instance of a string of one or more content text characters of an HTML document, for which an enunciation modification table has an entry, with an enunciation replacement string of text characters indicated in said entry, said enunciation replacement string being converted to speech audio of a particular one of multiple permissible enunciations of said replaced string of content text characters, and replacing each instance of a second string of content text characters of an HTML document, for which a terminology translation table has an entry, with a translation string of text characters in said entry, said translation string of text characters being convertible to speech audio, and at least part of said second replaced string of content text characters being unconvertible to speech audio, by a predetermined text to speech converter.

4. In a tag converter for intonation modification and audio data insertion, a method for converting data of a hyper text markup language (HTML) document comprising the steps of:

modifying the intonation and speed of speech audio generated for content text encapsulated by, and inserting audio data at, each instance of an HTML text tag for which a tag mapping table has an entry, an indication to access a parameter set table, and a first pointer to a particular entry of said parameter set table, according to intonation and speed parameters specified in said entry of said parameter set table pointed to by said first pointer, and generating a particular audio sound for each instance of an HTML text tag, for which said tag mapping table has an entry, an indication to access an audio data table, and a second pointer to a particular entry of said audio data table, from audio data specified in said entry of said audio table pointed to by said second pointer.

5. A method for converting data of a hyper text markup language (HTML) document to speech comprising the steps of:

parsing one or more HTML to speech (HTS) control rules, said step of parsing comprising the steps of:

in response to an intonation/speed rule, generating a tag mapping table entry indexed by an HTML text tag specified in said intonation/speed rule and containing a tag identifier unique to said HTML text tag, and generating a parameter set table entry, pointed to by said entry of said tag mapping table indexed by said tag specified in said intonation/speed rule, and containing a set of intonation and speed parameters indicated by said intonation/speed rule, in response to an audio data rule, generating a tag mapping table entry indexed by an HTML text tag specified in said audio data rule and containing a tag identifier unique to said HTML text tag, and generating an audio data table entry, pointed to by said entry of said tag mapping table indexed by said tag specified in said audio data rule, and containing audio data indicated by said audio data rule, in response to an enunciation rule, generating an enunciation table entry indexed by a text string in an HTML document and containing at least a replacement text string, that is converted to a particular audio sound of one of plural enunciations of said index text string, indicated by said enunciation rule, and in response to a terminology translation rule, generating a terminology translation table entry indexed by a text string in an HTML document that cannot be converted to an audio sound by a predetermined text to speech converter and containing a replacement text string that can be converted to an audio sound by said predetermined text to speech converter.

6. The method of claim 5 further comprising the step of extracting said HTS control rules from HTML comment text of an HTML document.

7. The method of claim 5 further comprising the step of reading said HTS control rules independently from HTML document data.

8. The method of claim 5 further comprising the steps of:

parsing data of an HTML document, in response to parsing an HTML text tag, attempting to index one or more entries of said tag mapping table using a particular parsed HTML text tag that encapsulates data yet to be parsed, using a pointer in each indexed tag mapping table entry, to identify entries of said intonation/speed table and said audio data table indicated by said indexed tag mapping table entries, modifying an intonation and speed by each set of parameters contained in each identified intonation/speed table entry, and inserting audio data contained in each identified audio table entry.

9. The method of claim 8 further comprising the steps of:

in response to parsing a start HTML text tag, pushing said start HTML text tag onto a stack, and in response to parsing an end HTML text tag, popping an HTML text tag from said stack, wherein said particular parsed HTML text tag used in said step of attempting to index is an HTML text tag at a top of said stack.

10. The method of claim 9 further comprising the steps of:

scanning content text of said HTML document, replacing each content text string of said HTML document that matches one of said text strings that indexes one of said entries in said terminology translation table with said replacement text string contained in said corresponding terminology translation table entry indexed by said matching text string, and replacing each content text string of said HTML document that matches one of said text strings that indexes one of said entries of said enunciation table with said replacement text string contained in said corresponding enunciation translation table entry indexed by said matching text string.

11. The method of claim 10 wherein a particular entry of said enunciation table further comprises a candidate text string, and wherein said content text string of said HTML document is only replaced with said replacement text string contained in said particular enunciation table entry if said content text string is contained in a second content text string of said HTML document that matches said candidate text string.

12. The method of claim 11 further comprising the steps of:

generating an audible sound including sound generated from said audio data and speech audio generated by converting content text of said HTML document and said replacement text strings, if any, to speech audio according to said intonation and speed parameters.

13. The method of claim 5 further comprising the steps of:

parsing data of an HTML document, scanning content text of said HTML document, replacing each content text string of said HTML document that matches one of said text strings that indexes one of said entries in said terminology translation table with said replacement text string contained in said corresponding terminology translation table entry indexed by said matching text string, and replacing each content text string of said HTML, document that matches one of said text strings that indexes one of said entries of said enunciation table with said replacement text string contained in said corresponding enunciation translation table entry indexed by said matching text string.

14. The method of claim 13 wherein a particular entry of said enunciation table further comprises a candidate text string, and wherein said content text string of said HTML document is only replaced with said replacement text string contained in said particular enunciation table entry if said content text string is contained in a second content text string of said HTML document that matches said candidate text string.

15. In a text normalizer and tag converter, a method for converting data of a hyper text markup language (HTML) document to speech audio comprising the steps of:

replacing each instance of a string of one or more content text characters of an HTML document, for which an enunciation modification table has an entry, with an enunciation replacement string of text characters indicated in said entry, said enunciation replacement string being converted to speech audio of a particular one of multiple permissible enunciations of said replaced string of content text characters, replacing each instance of a second string of content text characters of an HTML document, for which a terminology translation table has an entry, with a translation string of text characters in said entry, said translation string of text characters being convertible to speech audio, and at least part of said second replaced string of content text characters being unconvertible to speech audio, by a predetermined text to speech converter, and inserting audio data at each text tag for which a tag mapping table has an entry, as specified in corresponding entries of an audio data table.

* * * * *